Figure 1:
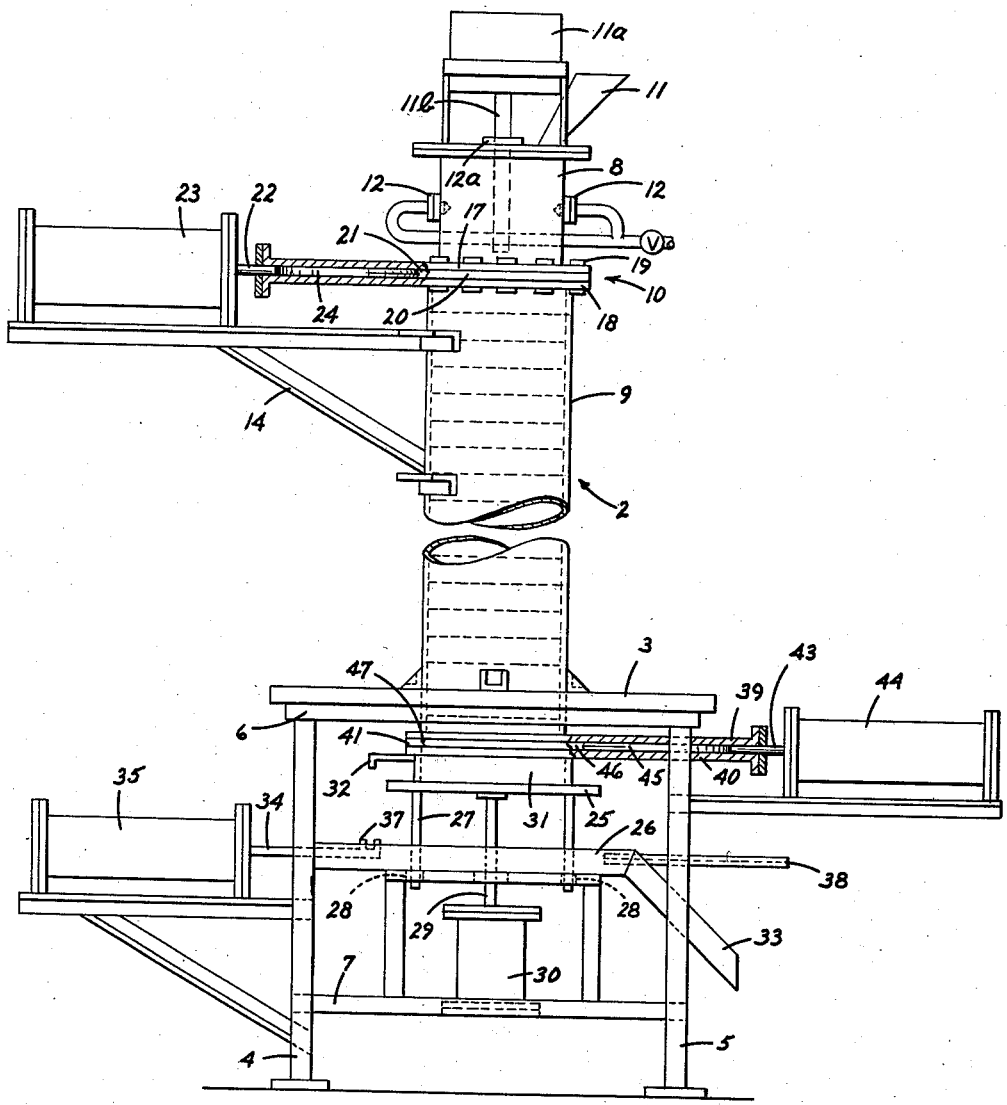

June 26, 1951 J. A. CALHOUN, JR 2,558,038
PRODUCTION OF CELLULOSE XANTHATE
Filed Nov. 23, 1946 2 Sheets-Sheet 1

INVENTOR.
JOHN ALFRED CALHOUN Jr.
BY
Thomas R. O'Malley

June 26, 1951     J. A. CALHOUN, JR     2,558,038
PRODUCTION OF CELLULOSE XANTHATE
Filed Nov. 23, 1946     2 Sheets-Sheet 2

INVENTOR.
JOHN ALFRED CALHOUN Jr.
BY
Thomas R. O'Nally

Patented June 26, 1951

2,558,038

UNITED STATES PATENT OFFICE 2,558,038

PRODUCTION OF CELLULOSE XANTHATE

John Alfred Calhoun, Jr., Swarthmore, Pa., assignor to American Viscose Corporation, Wilmington, Del., a corporation of Delaware Application November 23, 1946, Serial No. 711,923

9 Claims. (Cl. 260—216)

This invention relates to an improved process for the production of cellulose xanthate.

The known, and currently practiced method of making cellulose xanthate involves dumping alkali cellulose crumbs into a xanthating drum containing liquid carbon disulfide. The mass is then agitated or churned for a considerable period of time during which the chemical reaction resulting in production of the xanthate takes place. In that process, access of the carbon disulfide to all portions of the alkali cellulose crumbs depends upon absorption. The main disadvantage of the method is that chemical reaction between $CS_2$ and the alkali cellulose takes place at the surface of the crumbs before the $CS_2$ has penetrated to the interior. The result is that the crumbs very rapidly become sticky and viscid at the surface and agglomerate into lumps or coherent masses of varying size. Penetration of the $CS_2$ to the interior of the agglomerated crumbs is hampered, and the final product does not consist entirely of cellulose xanthate, since the agglomerated crumbs have a surface of cellulose xanthate encasing a core of unreacted alkali cellulose. It is practically impossible to obtain uniform distribution of the carbon disulfide through all portions of the alkali cellulose crumbs under such conditions, even when large excesses of liquid carbon disulfide are employed.

It is an object of this invention to provide an improved method of producing cellulose xanthate, in which the formation of sticky clumps is avoided during mixing of the alkali cellulose crumbs and carbon disulfide, and which insures intimate and uniform distribution of the carbon disulfide through all portions of the alkali cellulose, before chemical reaction is effected to any appreciable extent.

Essentially, this invention contemplates effecting admixture of alkali cellulose and carbon disulfide, and preferably carbon disulfide in atomized condition, while subjecting the ingredients to the action of high frequency compressional or longitudinal waves, herein called high frequency sound waves, that is, sound waves having a frequency in the range of from about 1000 to several billion cycles, per second or higher.

The sonic irradiation may be continued until cellulose xanthate is produced by chemical reaction. Alternatively the alkali cellulose crumbs and liquid carbon disulfide may be subjected to high frequency sound wave irradiation until an intimate physical mixture of the two has been obtained after which chemical reaction may be allowed to take place either under the influence of continued agitation, such as tumbling or churning, or while the physically well-intermingled alkali cellulose and $CS_2$ are maintained substantially at rest with relatively little, if any, disturbance of the mass. Further, the mass may be exposed to sonic irradiation simultaneously with churning or tumbling thereof. Intimate physical mixing of the alkali cellulose and liquid $CS_2$, and chemical reaction therebetween may take place in the same apparatus or compartments, or in separate zones or compartments.

Thus, according to one embodiment of the invention, the alkali cellulose crumbs and liquid carbon disulfide are placed in a churn of usual type mounted for rotation on a horizontal axis, one or more transducers for transmitting the high frequency sound wave radiations to the mass being suitably supported in or associated with the churn. Physical intermixing of the crumbs and liquid is effected by the waves transmitted by the transducer. After the period of sound wave irradiation required to insure thorough and uniform penetration of the carbon disulfide into and through each of the crumbs, the transducer may be disconnected from the generator with which it is connected. Rotation of the churn may then be initiated to insure agitation and tumbling of the mass until the chemical reaction is completed. However, it may be desirable to apply the sound wave radiations simultaneously with rotation of the churn and consequent tumbling of the contents thereof. Further, the sonic irradiation may be continued through at least the initial stages of the chemical reaction, after the intimate physical mixture has been obtained, and discontinued if the viscosity of the mass increases to a point at which transmission of the sound waves therethrough is impractical or inefficient.

According to another embodiment of the invention, alkali cellulose crumbs and liquid, preferably atomized, carbon disulfide are introduced, in successive batches comprising predetermined amounts of the reactants, into a zone in which a transducer is supported, or with which the transducer is associated, and the crumbs and liquid are irradiated until a physical mixture of the two is produced. After each batch has been irradiated as required, it is passed into a rest or reaction zone in which it is held substantially at rest until the chemical reaction is complete.

Because of the rapidity and uniformity of penetration of the liquid $CS_2$ into and through the crumbs, under sonic irradiation, which results in production of the intimate physical mixture of the two before chemical reaction takes place at the surface of the crumbs with development if viscid clumps, excess carbon disulfide is not required, and the carbon disulfide may be used in amounts corresponding to the amounts actually consumed in the chemical reaction.

The time required to produce the intimate physical mixture of alkali cellulose and carbon disulfide may vary and, depending upon the mass being treated, the frequency and amplitude of the sound waves, etc., may be measurable in seconds or minutes. Although reduction in the time required to produce the cellulose xanthate is not, in itself, a primary object of the invention, nevertheless it is an auxiliary factor of considerable value in the large-scale commercial production of viscose.

Regardless of the particular embodiment of the invention which is practiced, under sonic irradiation distribution of the liquid to all of the alkali cellulose crumbs, and to all portions of each of the individual crumbs is more uniform, for a given period of contact, than is otherwise attainable. This makes for a more homogeneous final product, and, ultimately, for superior articles comprising cellulose resulting from the viscose obtained by dissolving the cellulose xanthate produced in accordance with the invention, in a suitable solvent such as water or aqueous sodium hydroxide.

The sound waves may be generated by means of any suitable sound generating device, such as a piezo-electric sound generator, a magnetostriction sound generator, an electromagnetic sound generator, etc.

Figure 2:
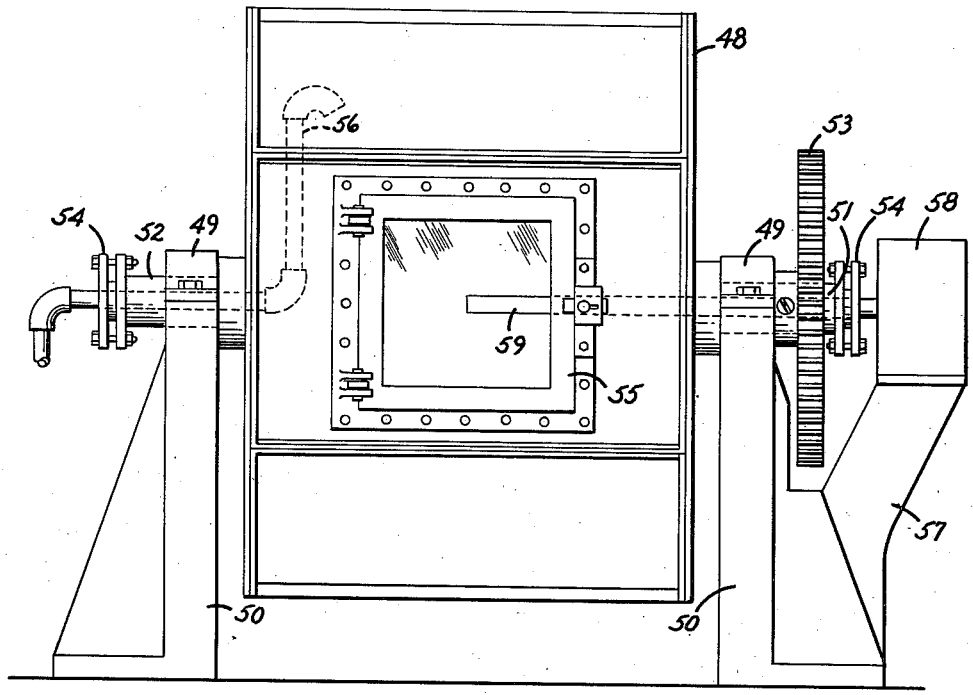

In the accompanying drawing,

Figure 1 is an elevation view of apparatus suitable for carrying out one embodiment of the invention, and Figure 2 is an elevation of apparatus for carrying out another embodiment.

Referring to Figure 1, the apparatus shown comprises a tower-like chamber 2 supported in a frame work comprising a platform 3 mounted on uprights 4 and 5, reinforced by cross-bars 6 and 7.

Chamber 2 comprises a sound wave irradiation zone 8, the bottom of which communicates with the top of a reaction or rest zone 9. A communicating juncture, shown generally at 10, is provided between the zones.

Alkali cellulose crumbs are fed into zone 8 through a hopper 11, and carbon disulfide is introduced into the zone, in the form of a fine mist or cloud, through the nozzles of a valve controlled atomizer 12.

Supported above zone 8 is a sound generator 11a having an associated transducer in the form of a transmission tube 11b which extends through the seal 12a into zone 8 for transmitting the high frequency sound wave radiations to the alkali cellulose crumbs and carbon disulfide to effect rapid and uniform penetration of the liquid through the crumbs. Alternatively, the transducer may be suitably supported in the compartment 8, as for example it may be affixed to the internal wall of the compartment. Instead of atomizing the carbon disulfide, measured quantities thereof may be added to the crumbs in bulk.

The communicating juncture between the two zones 8 and 9 comprises an oval-shaped flange 17 and an oval-shaped flange 18, the flanges being bolted together by bolts 19 with a spacing member 20 therebetween. Spacing member 20 has an opening therein corresponding in diameter to the diameters of the agitating and reaction zones and is provided with a longitudinal guideway 21 extending radially outwardly from the opening, between flanges 17 and 18.

The rod 22, extending from a piston slidable in a cylinder 23 mounted on a bracket 14 is secured to and is adapted to move a circular disk member 24. When rod 22 is pushed inwardly along guideway 21, the disk member 24 is brought into position between the irradiation and rest zones and serves as a temporary seal therebetween. When rod 22 is retracted, disk 24 is withdrawn from between the zones to permit transfer of the contents of zone 8 to zone 9.

A platen 25 is provided at the discharge end of zone 9 for supporting the batches introduced from zone 8. The platen is adapted to be lowered to the surface of a stationary support 26. The platen is steadied by guide posts 27 which reciprocate vertically in guideways 28 in support 26. Raising or lowering of platen 25 is effected by means of a rod 29 extending from a piston slidable in a cylinder 30 and secured to the bottom of the platen. In its upper position, the platen is maintained in position immediately under the discharge end of reaction zone 9. Retraction of rod 29 causes platen 25 to be lowered until it comes to rest on support 26.

Platen 25 carries a detached upstanding ring member 31 on its upper surface, which surrounds the platen. The ring is provided with a projecting hook 32. Means are provided for urging ring 31 across the surface of platen 25 whereby the batch is swept into a chute 33 which may lead to a hopper (not shown). For this purpose, there is provided a rod 34 secured to a piston slidable in a cylinder 35 and provided with upstanding lugs 37. When platen 25 is in its lower position, hook 32 on ring 31 extends downwardly into the space between lugs 37 so that motion of rod 34 effects movement of ring 31 through lugs 37 and hook 32. Opposed angle irons, one, 38 being shown, provide a guideway for supporting ring 31 when it is moved to the right of the drawing, thereby sweeping the load or batch down chute 33. Retraction of rod 34 pulls ring 31 back to its original position on platen 25.

Surrounding the rest or reaction zone, at the discharge end thereof, are flanges 39 and 40 having a spacing member 41 interposed therebetween. The spacing member is provided with an opening which corresponds with the inner diameter of the reaction zone and has a longitudinal guideway 42 extending radially outwardly from the opening. A rod 43 extending from a piston slidable in cylinder 44 is secured to and adapted to move a circular disc member 45, the diameter of which corresponds to the inner diameter of the reaction compartment. When rod 42 is pushed inwardly along the guideway, the disk member secured thereto is brought into position under the next to lowermost batch in the reaction zone. The disk member is provided with an upstanding projection 46 which fits into a recess 47 in the interior wall of the reaction compartment so that the disk is held securely in place. The disk member 45, when injected between the lowermost batch resting on the platen 25 at the discharge end of the reaction zone and the remaining batches, serves to support all of the batches except the lowermost one in the reaction compartment and to effectively prevent the escape of carbon disulfide gas from the chamber. After injection of the member 45 the platen 25 is lowered to dumping position.

During operation of the apparatus, the reaction zone 9 is normally filled with a plurality of batches from the irradiation zone. As each succeeding irradiated batch of alkali cellulose and $CS_2$ is introduced into the reaction compartment from the irradiation zone 8, the batches pile up above platen 25 which is in receiving position at the discharge end of the tower with ring 31 surrounding the lower end of the tower. When chemical reaction between the alkali cellulose and carbon disulfide of the lowermost batch is completed, and the batch is ready to be removed from the reaction zone 9, disk member 45 is inserted under the next to last batch, in order to support all of the batches except the lowermost one, which is withdrawn with the platen 25 to dumping position. After dumping of the withdrawn batch, the platen is returned to receiving position at the discharge end of the reaction zone. Rod 43 is then retracted so that disk 45 is withdrawn, and the lowermost batch in the reaction zone falls onto the surface of the platen, causing all of the batches to shift downwardly through the reaction zone. Shifting of the batches is effected without substantial disturbance or movement of the crumbs relative to one another. As each successive batch of cellulose xanthate is withdrawn from one end of the reaction zone, a fresh batch consisting of a physical mixture of alkali cellulose and carbon disulfide is introduced from the irradiation zone 8.

The various coating elements of the apparatus may be valve-controlled and the valves may be actuated in any suitable manner, either manually, as by means of levers or the like, or electrically, the operations in any case being carried out sequentially and in a predetermined unit of time to perform the operations as described herein. In zone 8, the alkali cellulose is physically mixed with the carbon disulfide in liquid phase; however, in the reaction compartment 9, cellulose xanthate is produced by reaction between the solid alkali cellulose and carbon disulfide in the gaseous phase. The heat generated in the reaction may be supplemented by the use of suitable jacketing means, if desired. Preferably, the reaction compartment 9 is provided with a safety valve.

Depending upon the time required to effect intimate physical admixture of the alkali cellulose and atomized carbon disulfide in zone 8 under the influence of the sonic radiations, which can be determined by experiment, the various valves are actuated in sequence so that a batch of cellulose xanthate is withdrawn from the reaction zone and a batch comprising physically mixed alkali cellulose and $CS_2$ is introduced into the reaction zone in a given time period, the length of the reaction zone 9 being calculated to afford opportunity for the chemical reaction to be completed before each of the batches is withdrawn therefrom. At the start of operations, the reaction compartment may be loaded with waste. Thereafter, if a period of, say, two minutes is required to effect thorough physical mixing of the alkali cellulose crumbs and liquid $CS_2$ under the influence of the high frequency sound wave radiations, then the means for effecting withdrawal of disk 24 from between the zones and the means for effecting injection of disk 45 at the discharge end of the reaction compartment are set so that disk 24 is withdrawn, and disk 45 is injected simultaneously at intervals of two minutes. Operation of the generator may be discontinued during introduction of the atomized carbon disulfide and alkali cellulose crumbs into zone 8 and during withdrawal of the physical mixture from the zone.

Referring to Fig. 2 there is shown a conventional xanthating churn 48 supported in bearings 49 on standards 50 for rotation on a horizontal axis in response to operation of the hollow stub shafts 51 and 52 which are welded to the churn, shaft 51 being driven through gear 53 by a motor (not shown). Packing glands 54 are provided on each of the shafts. The churn is provided with a hinged door 55 having a sight-glass and adapted to be locked in closed position when the churn is in operation. Liquid carbon disulfide is introduced into the churn through the hollow shaft 52 and sprayhead 56 connected therewith from a storage tank in the usual manner. Supported on a standard 57 is a generator 58 having a transmission tube or transducer 59 which extends through hollow shaft 51 and into the churn for transmitting high frequency sound wave radiations to the contents of the churn. A suitable packing is provided between the transmission tube and the inner wall of the shaft 51, and is spaced away from the wall of the shaft whereby the shaft may rotate without effecting rotation of the tube. The packing may comprise a suitable resilient material such as neoprene or the like which permits vibrating motion of the tube.

After the churn has been charged, the generator 58 is set in operation to expose the mass of alkali cellulose crumbs and carbon disulfide to the effects of the high frequency sound waves. The radiations may be applied only for the period required to effect intimate physical mixing of the ingredients, or it may be continued through at least the initial stages of chemical reaction between the alkali cellulose and $CS_2$ to produce the xanthate. In either case, the sonic radiations may be applied while the churn is held in non-rotating position, or they may be applied simultaneously with rotation of the churn to effect tumbling of the contents thereof. The latter procedure has the advantage that each portion of the mass being irradiated is brought successively into the vicinity of the transducer to insure uniform irradiation of the mass throughout.

In either of the embodiments illustrated, more than one transducer may be employed, and the transducers may be supported directly in the irradiation zone 8 (Fig. 1) or in the xanthating churn.

The invention makes possible the production of a homogeneous cellulose xanthate from which is practically fiber-less, and more readily filtered viscose can be obtained.

Although the invention has been illustrated and described in terms of certain specific embodiments, it will be obvious that many modifications may be made therein without departing from the spirit and scope of the invention or of the appended claims.

I claim:

1. A process for producing cellulose xanthate which comprises subjecting a mass comprising particulate alkali cellulose and liquid carbon disulfide to the influence of high frequency sound wave radiations having a frequency of at least 1000 cycles per second at least until an intimate physical mixture in which the carbon disulfide is distributed substantially uniformly throughout all portions of the alkali cellulose particles is produced, and then bringing the chemical reaction to completion to obtain a substantially homogeneous cellulose xanthate.

2. The method as in claim 1, wherein the mass comprising the particulate alkali cellulose and liquid carbon disulfide is subjected to external forces which cause tumbling of the mass during the irradiation with the sound waves.

3. A process for producing cellulose xanthate which comprises subjecting a mass comprising particulate alkali cellulose and carbon disulfide to the radiations of high frequency sound waves having a frequency of at least 1000 cycles per second and to external forces which cause tumbling of the mass, to produce, as an initial product, and prior to chemical reaction, an intimate physical mixture in which the carbon disulfide is distributed substantially uniformly throughout all portions of the particles, and thereafter continuing the sound wave irradiation and tumbling until the alkali cellulose and carbon disulfide are chemically reacted to produce a substantially uniform cellulose xanthate.

4. A process for producing cellulose xanthate which comprises subjecting a mixture comprising particulate alkali cellulose and liquid carbon disulfide to the radiations of high frequency sound waves having a frequency of at least 1000 cycles per second to produce, as an initial product, and prior to chemical reaction, an intimate physical mixture in which the carbon disulfide is distributed substantially uniformly throughout all portions of the alkali cellulose particles, and then subjecting the physical mixture to external forces which cause tumbling of the mass until the alkali cellulose and carbon disulfide are chemically reacted and a substantially uniform cellulose xanthate is produced.

5. A process for producing cellulose xanthate which comprises subjecting a mass comprising particulate alkali cellulose and liquid carbon disulfide to the radiations of sound waves having a frequency of at least 1000 cycles per second to produce, as an initial product and prior to chemical reaction, an intimate physical mixture in which the carbon disulfide is distributed substantially uniformly throughout all portions of the alkali cellulose particles, and then maintaining the intimate mixture in the absence of external forces tending to cause relative movement of the particles until the chemical reaction is completed and a substantially uniform cellulose xanthate is produced.

6. A process as in claim 1, wherein the intimate physical mixture is produced from a mass comprising particulate alkali cellulose and an amount of liquid carbon disulfide which corresponds substantially to the amount thereof consumed in the chemical reaction resulting in cellulose xanthate.

7. A process as in claim 2, wherein the intimate physical mixture is produced from a mass comprising particulate alkali cellulose and an amount of liquid carbon disulfide which corresponds substantially to the amount thereof consumed in the chemical reaction resulting in cellulose xanthate.

8. A process for the production of cellulose xanthate which comprises intermittently introducing batches of particulate alkali cellulose and liquid carbon disulfide into a field of high frequency sound waves having a frequency of at least 1000 cycles per second to produce, as an initial product and prior to chemical reaction, an intimate physical mixture of the two in which the carbon disulfide is distributed substantially uniformly throughout all portions of the particles, intermittently withdrawing the batches comprising the physical mixture from the field, intermittently introducing the batch into a reaction zone wherein the chemical reaction resulting in the production of substantially homogeneous cellulose xanthate is brought to completion, and intermittently withdrawing the batches of cellulose xanthate from the reaction zone.

9. A process as in claim 8, wherein the intimate physical mixture is produced from a mass comprising particulate alkali cellulose and an amount of liquid carbon disulfide which corresponds substantially to the amount thereof consumed in the chemical reaction resulting in cellulose xanthate.

JOHN ALFRED CALHOUN, Jr.

REFERENCES CITED

The following references are of record in the file of this patent:

UNITED STATES PATENTS

| Number | Name | Date |
|---|---|---|
| 520,770 | Cross | June 5, 1894 |
| 2,163,649 | Weaver | June 27, 1939 |
| 2,293,840 | Lignian | Aug. 25, 1942 |
| 2,462,554 | Robinson | Feb. 22, 1949 |

FOREIGN PATENTS

| Number | Country | Date |
|---|---|---|
| 468,993 | Great Britain | July 16, 1937 |
| 522,083 | Great Britain | June 7, 1940 |
| 423,382 | Canada | Oct. 24, 1944 |
| 740,270 | Germany | Aug. 26, 1943 |

OTHER REFERENCES

Wood et al., Philosophical Magazine and Journal of Science VII, 4, pages 430, 433 (1927).

Marinesco, Chimie and Industrie, volume 55, No. 4, pages 263–268, April 1946.